(12) United States Patent
Millar et al.

(10) Patent No.: US 7,375,743 B2
(45) Date of Patent: May 20, 2008

(54) SURVEILLANCE SYSTEM CONTROLLER

(76) Inventors: Greg Max Millar, 32121 Bass Field Rd., Coarsegold, CA (US) 93614; Richard Todd Boswell, 4857 N. West Ave., Fresno, CA (US) 93705; Brian Rudolf Grziwok, 1230 Willard St., San Francisco, CA (US) 94117; Yuriy Nikolayevich Kambo, 802 Burl Ave., Clovis, CA (US) 93611

( * ) Notice: Subject to any disclaimer, the term of this patent is extended or adjusted under 35 U.S.C. 154(b) by 524 days.

(21) Appl. No.: 10/852,844

(22) Filed: May 25, 2004

(65) Prior Publication Data

US 2005/0275719 A1    Dec. 15, 2005

(51) Int. Cl.
*H04N 5/232* (2006.01)

(52) U.S. Cl. .................. 348/211.7; 348/143
(58) Field of Classification Search .......... 348/211.7, 348/143–160; D14/454; D21/333
See application file for complete search history.

(56) References Cited

U.S. PATENT DOCUMENTS

| | | | |
|---|---|---|---|
| 4,181,966 A | 1/1980 | Wenninger et al. | |
| 4,654,818 A | 3/1987 | Wetterau, Jr. | |
| 4,794,381 A | 12/1988 | Iwai | |
| 4,870,531 A | 9/1989 | Danek | |
| 5,049,863 A | 9/1991 | Oka | |
| 5,126,955 A | 6/1992 | Tomoda | |
| 5,144,302 A | 9/1992 | Carter et al. | |
| 5,208,736 A | 5/1993 | Crooks et al. | |
| 5,440,502 A | 8/1995 | Register | |
| 5,500,643 A | 3/1996 | Grant | |
| 5,546,334 A | 8/1996 | Hsieh et al. | |
| 5,615,081 A | 3/1997 | Ma | |
| 5,615,083 A * | 3/1997 | Burnett | 361/686 |
| 5,865,546 A | 2/1999 | Ganthier et al. | |
| D411,530 S | 6/1999 | Carter et al. | |
| D435,542 S * | 12/2000 | Onoda et al. | D14/218 |
| D453,932 S * | 2/2002 | Han et al. | D14/401 |
| D456,854 S * | 5/2002 | Ashida | D21/333 |
| 6,682,040 B1 * | 1/2004 | MacEachern | 248/349.1 |
| 6,697,251 B1 * | 2/2004 | Aisenberg | 361/683 |

OTHER PUBLICATIONS

Atari Games, Inc., "Marble Madness Operator's Manual", 1985, Atari Games, Inc., p. 1-2 and p. 3-5.*
Product Specification: *"KBD300A Keyboard, Full-Functionality, Fixed/Variable Speed, PTZ Control"*, Pelco DataFax, Spec: 2527, Rev. Oct. 2003.

* cited by examiner

*Primary Examiner*—Lin Ye
*Assistant Examiner*—Anthony J Daniels
(74) *Attorney, Agent, or Firm*—Paul T. Kashimba, Esq.

(57) ABSTRACT

A surveillance system controller comprising a housing, a first control module and a second control module. The first control module is located in a first location in the housing, and it is rotatable around a first axis so that the first control module can be rotated to a first angular position. The second control module is located in a second location in the housing, and it is rotatable around a second axis so that the second control module can be rotated to a second angular position independent of the first angular position.

12 Claims, 11 Drawing Sheets

SURVEILLANCE SYSTEM CONTROLLER

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates to surveillance systems and, in particular, to a controller for use in a surveillance system. As used herein the term surveillance system includes building management and security systems.

The controllers have been used in the surveillance systems to select and control video cameras. The controller usually provides a number of keys to perform various functions and a joystick to control the pan, tilt and zoom of the camera under present control. Security personnel may operate these controllers for extended periods, which can become tedious and tiring. The prior art controllers have their keys and joysticks fixed in position. The security personnel operating the controller must position themselves as best they can in relation to the controller and then hold their hands in a position that may not be ergonomically suited to the operator. Accordingly, there has been a long felt need for a surveillance system controller that provides an ergonomic advantage to the operator while still providing the required video controls.

SUMMARY OF THE INVENTION

In accordance with the present invention there is provided a surveillance system controller comprising a housing, a first control module and a second control module. The first control module is located in a first location in the housing, and it is rotatable around a first axis so that the first control module can be rotated to a first angular position. The second control module is located in a second location in the housing, and it is rotatable around a second axis so that the second control module can be rotated to a second angular position independent of the first angular position.

In an alternative embodiment of the present invention there is provided a surveillance system controller comprising a housing having a plurality of apertures and a plurality of electrical connectors, a first control module positioned in a first aperture of the plurality of apertures and having a first electrical connector connected to a first electrical connector of the plurality of electrical connectors, and a second control module positioned in a second aperture of the plurality of apertures and having a second electrical connector connected to a second electrical connector of the plurality of electrical connectors, wherein the first and second control modules can be interchanged between the first and second apertures.

In various alternative embodiments the present invention can have a convex shape on the side intended to be closest to a user of the controller or a third control module located in the housing between the first and second control modules. This third control module can be interchangeable with either of the first and second control modules. The control modules may comprise one of the following: a control module having a joystick and control buttons, a control module having controls for controlling video storage devices, or a control module having a keypad. In addition, the three control modules can be located in the controller so that an arc drawn from the periphery of the first, second and third modules is similar in shape to the convex shape of the first side intended to be closest to a user of the controller.

Other advantages and applications of the present invention will be made apparent by the following detailed description of the preferred embodiment of the invention.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

Figure 1:
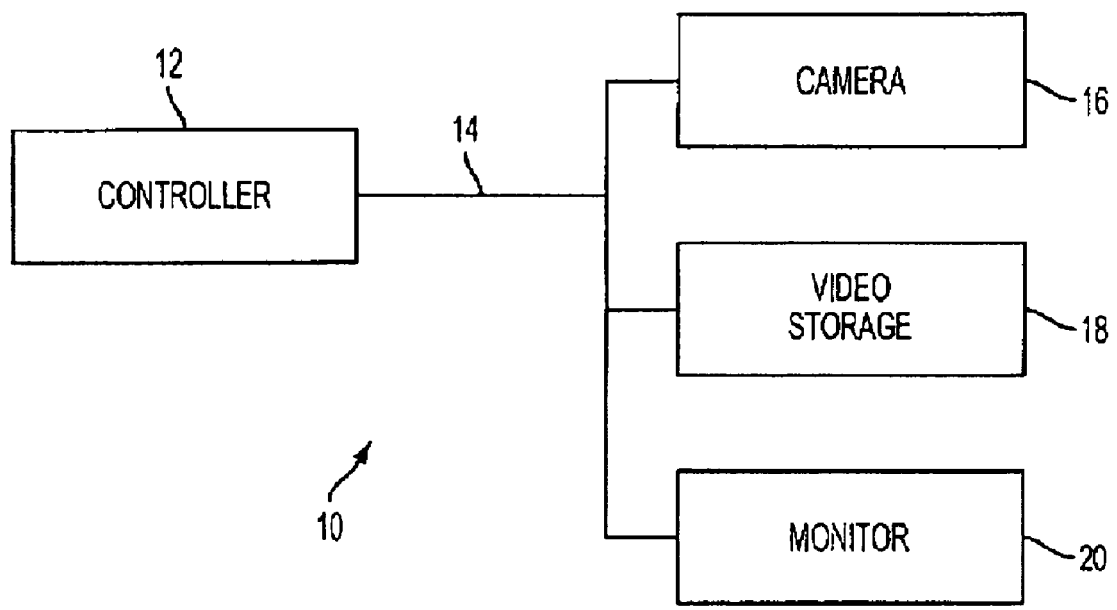
FIG. 1 is a block diagram of a video surveillance system utilizing the present invention.

Referring to FIG. 1, a video surveillance system is shown generally by numeral 10. Controller 12 is connected by network 14 to video surveillance camera 16, video storage 18, and monitor 20. Network 14 can be a hard-wired closed network, local area network, or wide area network such as the Internet. Controller 12 transmits and receives appropriate electrical signals to control camera 16, such as its pan, tilt, and zoom functions as is known in the art. The video signals from camera 16 may be viewed on monitor 20 and stored in video storage 18, which can be a videocassette recorder or digital video recorder.

Figure 2:
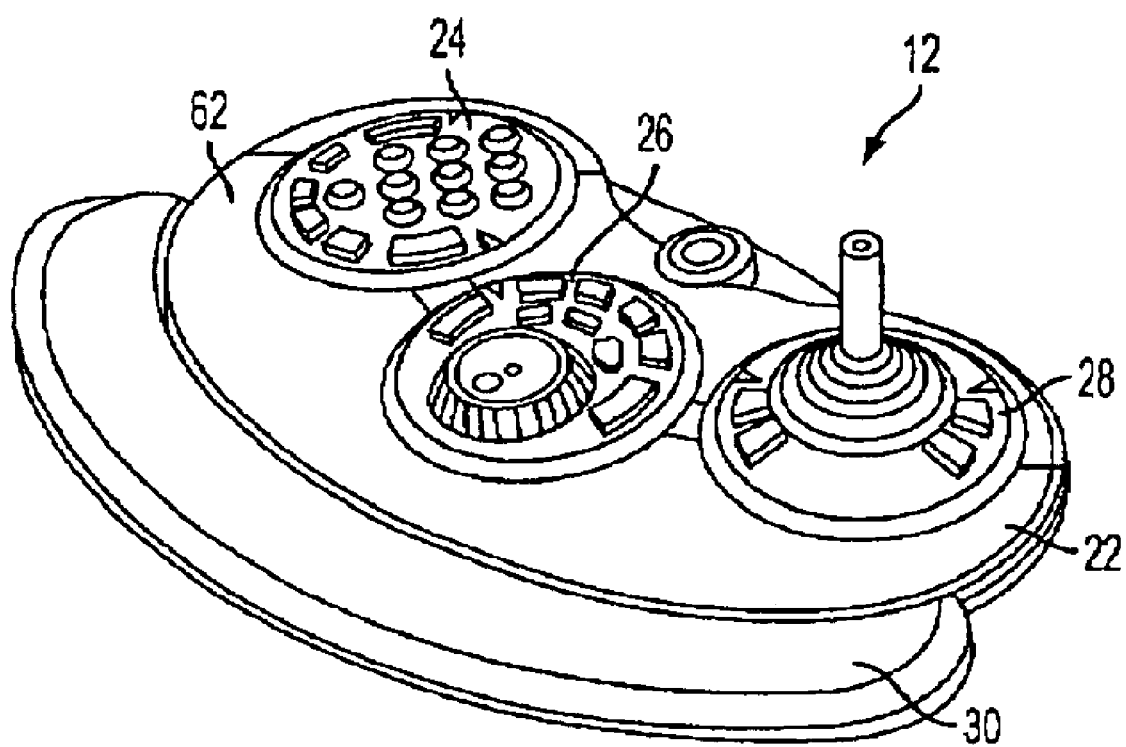
FIG. 2 is a perspective view of a controller utilizing the present invention.

Referring to FIG. 2, controller 12 has a housing 22 which contains three control modules, 24, 26 and 28, and optional wrist support 30. Control module 24 contains a plurality of keys for keypad control type functions. Control module 26 contains a jog/shuttle control and several keys for video playback control from video storage devices. Control module 28 contains a joystick and several keys for control of a video surveillance camera, including pan, tilt, zoom and other functions. The positions of control modules 24, 26, and 28 can be changed in any configuration, for example, control module 28 can be located where control module 24 is and vice versa. This feature allows the user to place the control module that is used most of the time in the position for control by the user's preferred arm. In addition, although three control modules have been shown, it is not necessary that controller 12 have three control modules. In the case where less than three control modules are used a plate or plates are placed over the unused position or positions. In addition, control modules 24, 26, and 28 can be rotated independently to be aligned with the user to provide ergonomic comfort and advantage. Optional wrist support 30 provides additional comfort and ergonomic support to a user.

Figure 3:
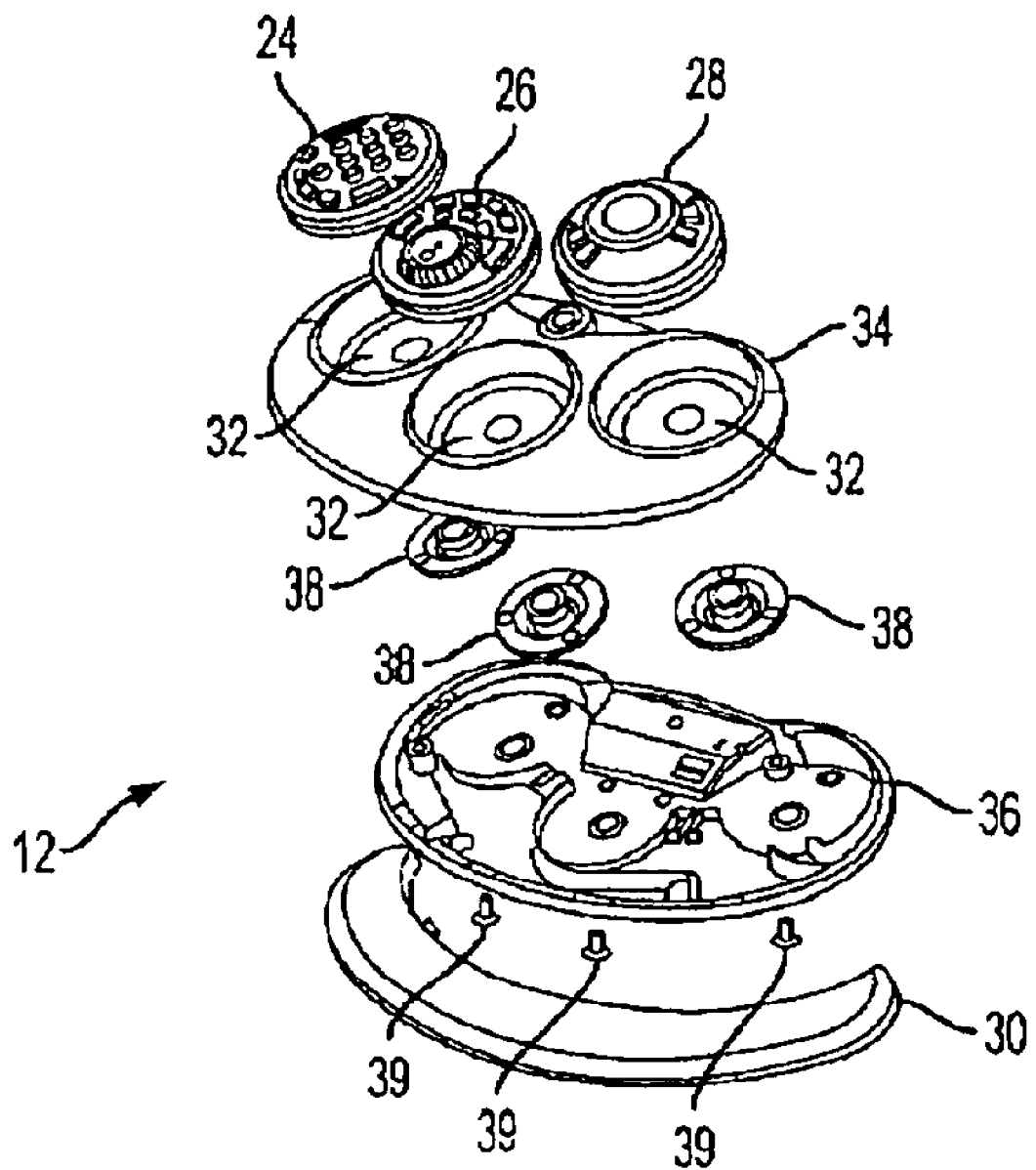
FIG. 3 is an exploded perspective view of the controller shown in FIG. 2.

FIG. 3 is an exploded perspective view of controller 12 which illustrates that control modules 24, 26, and 28 are placed in their respective module cavities 32 in top portion 34 of housing 22. Module clickers 38 are located between top portion 34 and bottom portion 36 of housing 22 and are connected to control modules 24, 26, and 28 by screws 39. The function and interconnection of module clickers 38 with control modules 24, 26, and 28 is explained in detail below. Top portion 34 and bottom portion 36 of housing 22 can be made of plastic or other suitable material.

Figure 4:
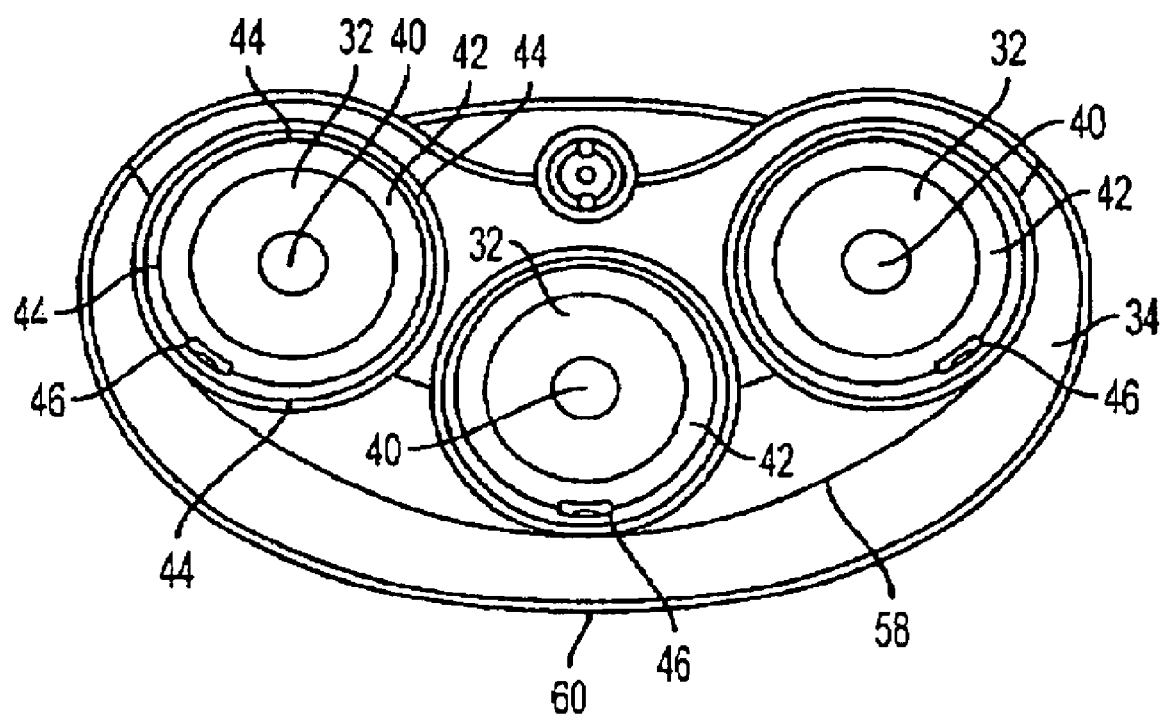
FIG. 4 is a plan view of the housing shown in FIG. 3.
Figure 5:
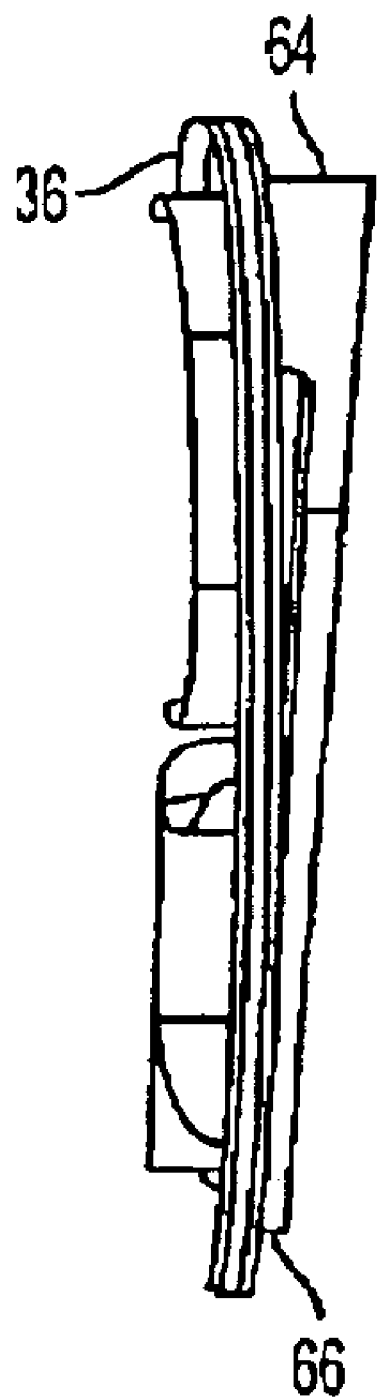
FIG. 5 is a side view of the bottom portion of the housing.
Figure 6:
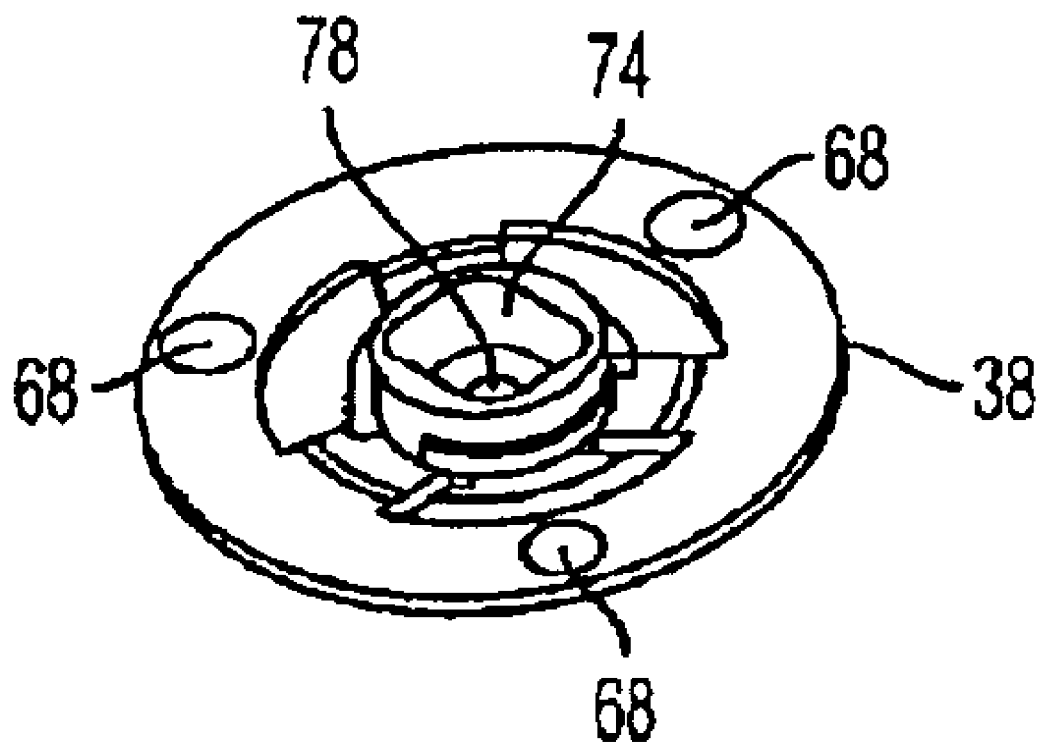
FIG. 6 is a perspective view of the clicker show in FIG. 3.
Figure 7:
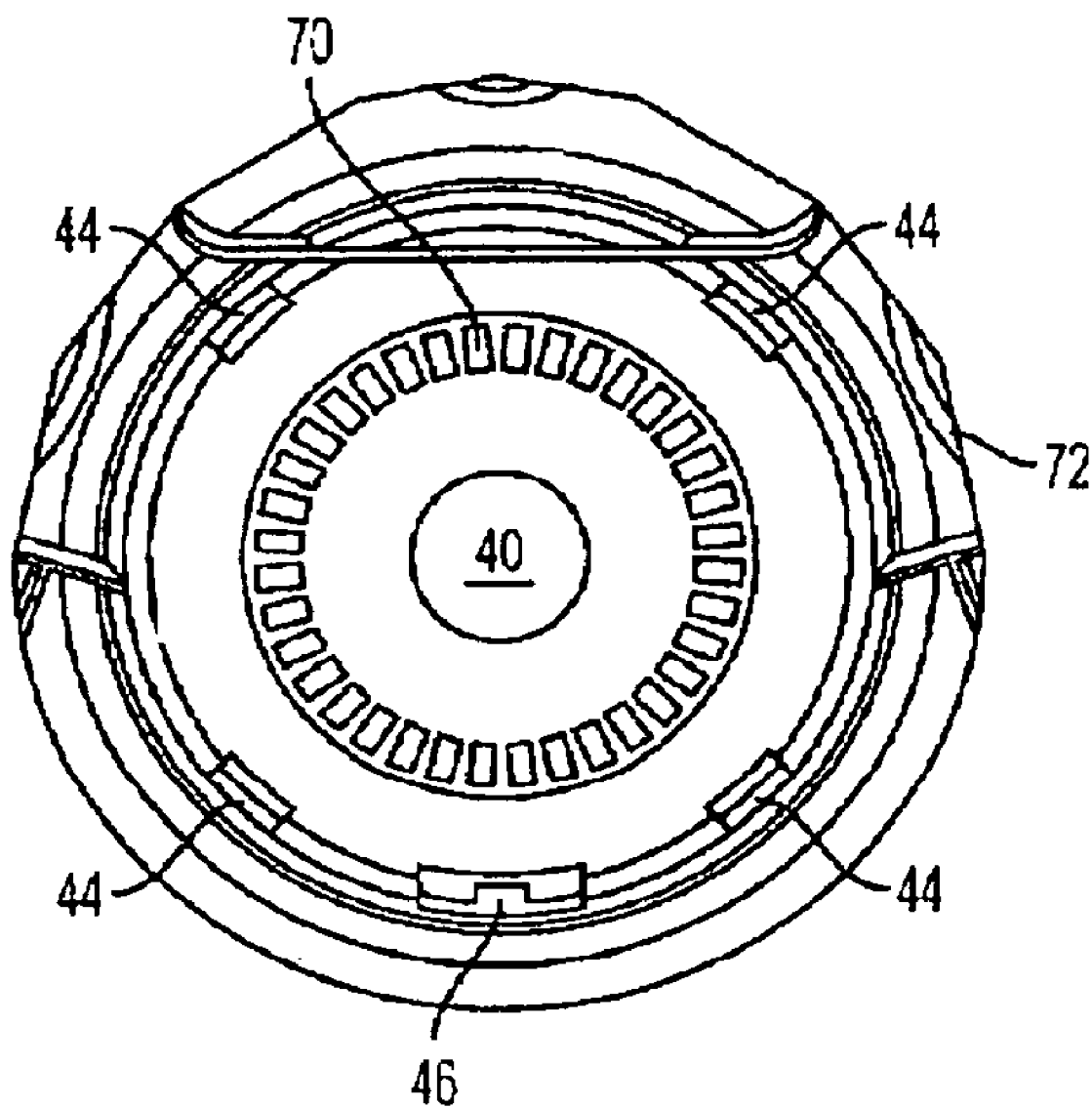
FIG. 7 is a partial bottom view of the top portion of the housing shown in FIG. 3.
Figure 10:
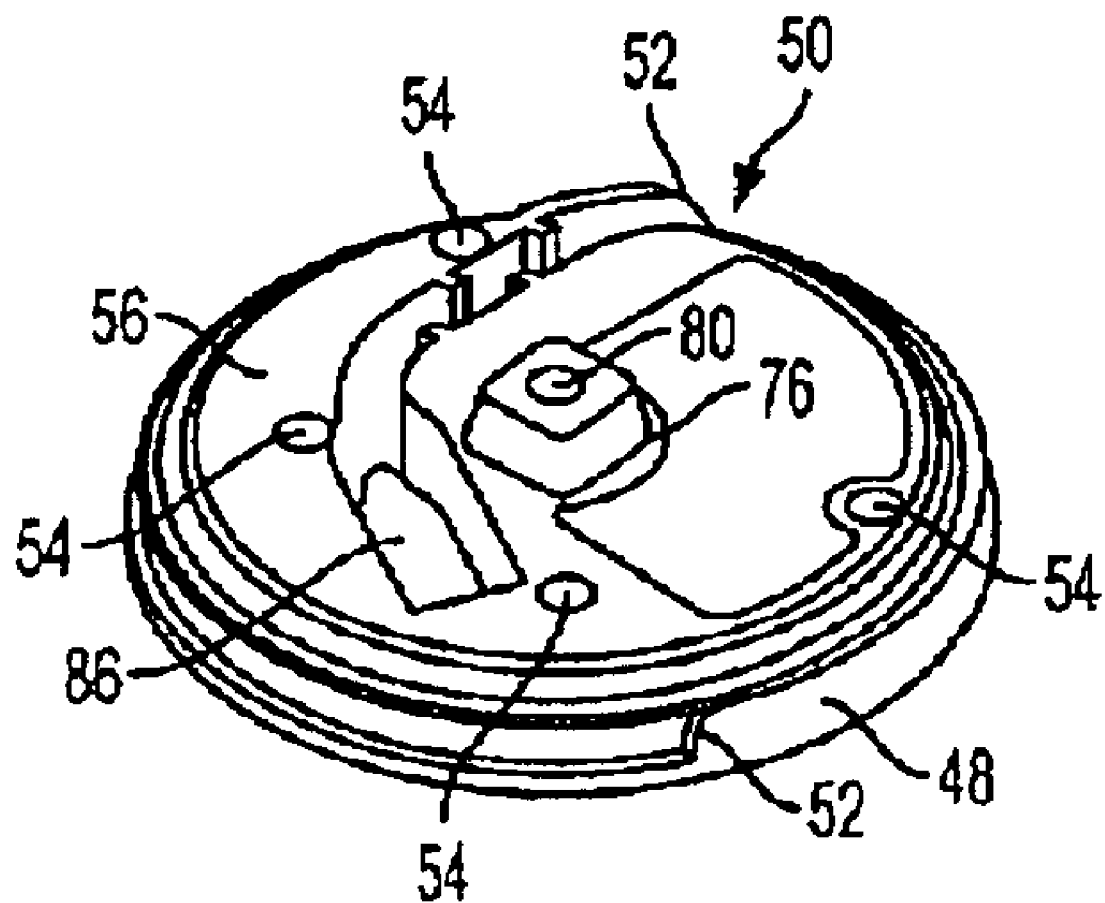
FIG. 10 is a perspective view of the module bottom of the control modules shown in FIG. 3.

FIG. 4 shows a top view of top portion 34 of housing 22. Each module cavity 34 has a center aperture 40 and a ring 42 of durable, low wear, low friction plastic such as Delrin® acetal resin available from DuPont. There are four notches 44 in each module cavity 32 in which suitable tabs from ring 42 can be placed to hold ring 42 in position without slippage. In addition, each module cavity 34 has a stop 46 which mates with lip 48 of module bottom 50, which is shown in FIG. 10. Module bottom 50 has edges 52 which limit the amount that bottom module 50 can be rotated in module cavity 32; this in turn limits the amount that control modules 24, 26, and 28 can be rotated since a module bottom 50 is connected to each of control modules 24, 26, and 28 by screws, not shown, that are placed in holes 54. The amount that control modules 24, 26, and 28 can be rotated is preferably 180 degrees or less. Surface 56 of bottom module 50 rests on ring 42 and slides on ring 42 when bottom module 50 is rotated. Line 58 which is drawn along the periphery of control modules 24, 26, and 28 shows an arc that is similar in shape to the convex shape of side 60. The convex shape of side 60 in combination with the rotatable positioning of control modules 24, 26, and 28 provides an ergonomic advantage to the user. In addition, as shown in FIG. 1, top surface 62 of controller 12 is sloped slightly towards the user to provide additional comfort and ergonomic advantage to a user. With reference to FIG. 5, back support wall 64 is higher than front support wall 66 to provide the slight incline of top surface 62.

Referring to FIGS. 2, 6, 7, 9, and 10, clicker 38 has three raised portions 68 that engage with teeth 70 on the bottom side 72 of top portion 34 of housing 22 to maintain the position of control modules 24, 26, and 28 when they are rotated to the desired position. Clicker 38 has a cavity area 74 that mates with raised portion 76 on module bottom 50. Cavity area 74 has an aperture 78 that aligns with aperture 80 in raised portion 76 so that when screw 39 is inserted through aperture 83 in bottom portion 36 of housing 22 it fastens clicker 38 to control modules 24, 26, and 28 thereby engaging raised portions 68 with teeth 70. The bottom of clicker 38 engages rings 82 on top surface 84 of bottom portion 36 of housing 22. Bottom module 50 has a channel 86 to accommodate at electrical connector, such as a USB connector, to connect to control modules 24, 26, and 28.

Figure 8:
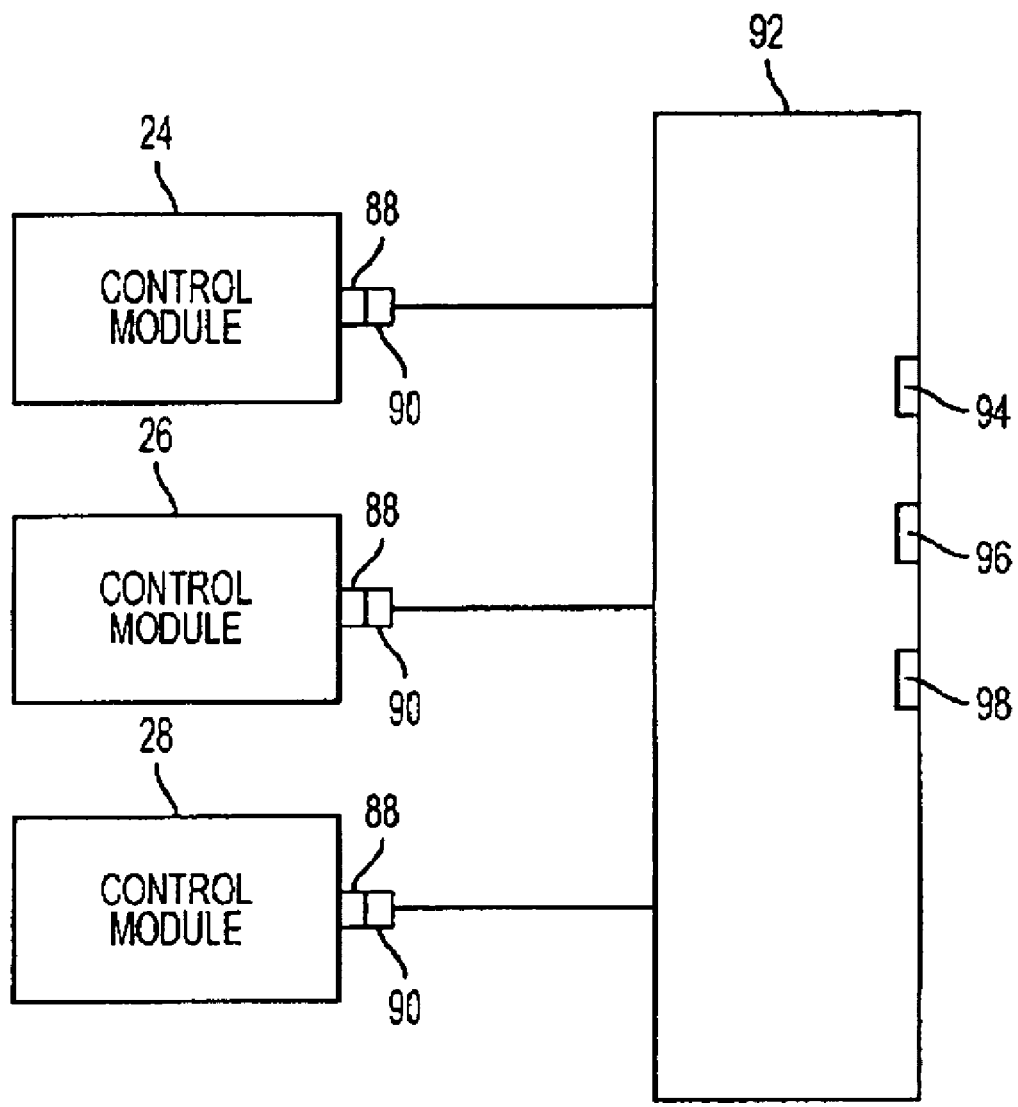
FIG. 8 is a bock diagram of the electrical connections of the modules and printed circuit board of the present invention.
Figure 9:
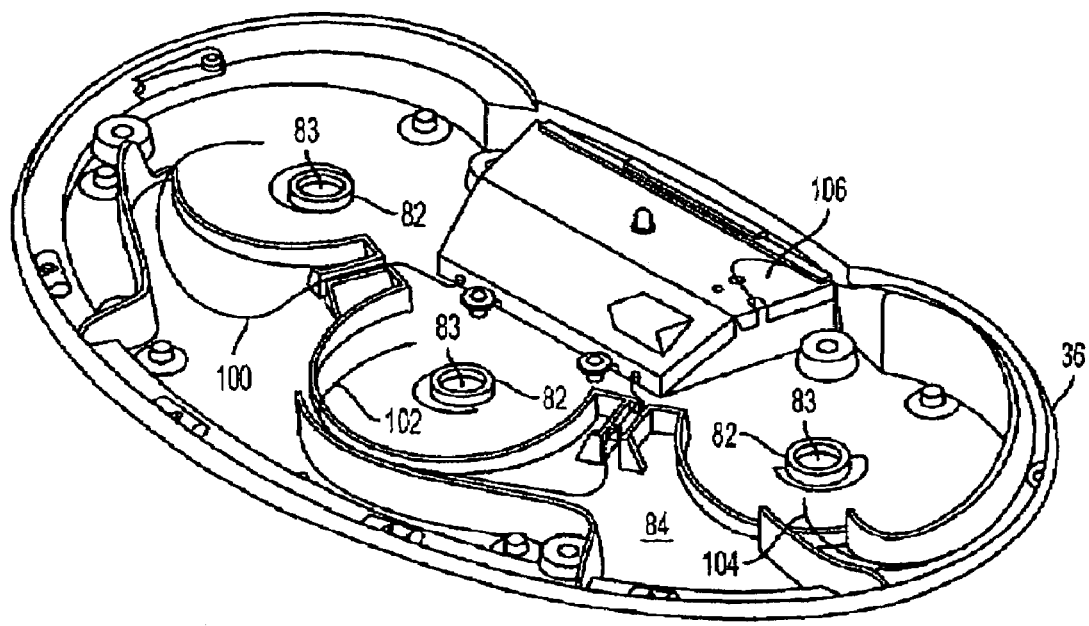
FIG. 9 is a perspective top view bottom portion of the housing shown in FIG. 3.

FIG. 8 shows schematically the electrical connections of the present invention. Control modules 24, 26, and 28 each have an electrical connector 88 which mates with electrical connector 90 from circuit board 92. Connectors 88 and 90 can be USB type connectors. Circuit board has connectors 94, 96, and 98, which can be USB connectors, phone jacks or other suitable connectors for communication between controller 12 and network 14, as is shown in FIG. 1. In addition, other types of devices, for example digital storage devices, can be connected to connectors 94, 96, and 98. In FIG. 9, lines 100, 102, and 104 indicate the routing of the electrical wires from connectors 90 to circuit board 92 which is contained inside enclosure 106.

Figure 11:
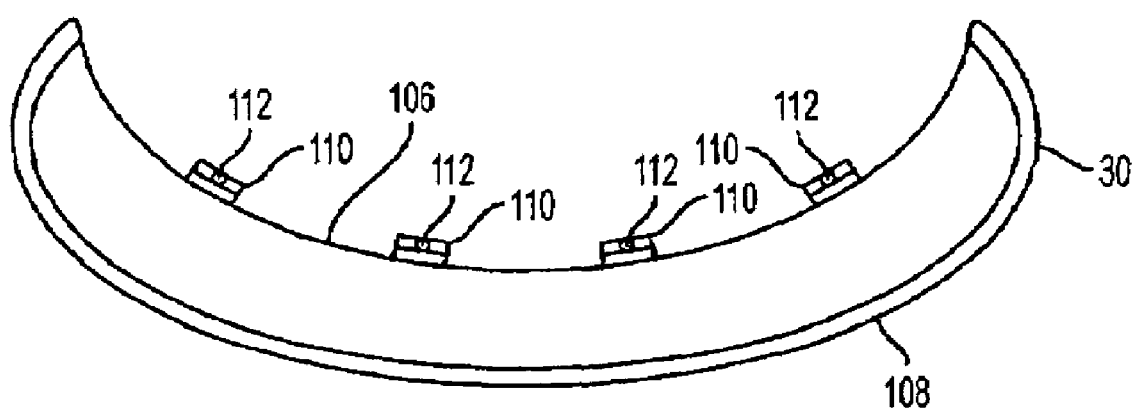
FIG. 11 is a plan view of the wrist support shown in FIG. 3.

Wrist support 30, which is shown in FIG. 11, has a concave side 106 that mates with the shape of side 60 of housing 22 and a convex side 108 that is similar in shape to the shape of side 60 of housing 22. Wrist support 30 has four tabs 110 with apertures 112 through which screws can be inserted to fasten wrist support 30 to bottom portion 36 of housing 22.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A surveillance system controller comprising: a housing having a first cavity and a second cavity; a first control module having a plurality of control keys, said first control module being located in said first cavity and being rotatable around a first axis so that said first control module can be rotated to a first angular position; and a second control module having a plurality of control keys, said second control module being located in said second cavity and being rotatable around a second axis so that said second control module can be rotated to a second angular position independent of said first angular position thereby locating said plurality of control keys of said first control module and said plurality of control keys of said second control module to accommodate the ergonomic needs of a user.

2. A surveillance system controller as recited in claim 1, wherein said first and second control modules are interchangeable in said housing so that said first control module can be located in said second cavity in said housing and said second control module can be located in said first cavity in said housing.

3. A surveillance system controller as recited in claim 2, wherein said housing has a plurality of electrical connectors and said first and second control modules each have an electrical connector respectively connected to one of said plurality of electrical connectors in said housing.

4. A surveillance system controller as recited in claim 3, wherein said housing has a first side that has a convex shape, said first side being intended to be closest to a user of said controller.

5. A surveillance system controller as recited in claim 4, wherein said housing has a third cavity and further comprising a third control module located in said third cavity, said third cavity being located in between said first and second cavities.

6. A surveillance system controller us recited in claim 5, wherein said third control module is interchangeable with either of said first and second control modules.

7. A surveillance system controller as recited in claim 4, further comprising a first mechanical fastener fur said first control module and a second mechanical fastener for said second control module to fasten said first and second control modules in their respective positions in said first and second cavities while allowing said first and second control modules to be rotated.

8. A surveillance system controller as recited in claim 6, wherein said first, second, and third control modules may comprise one of the following: a control module having a joystick and a plurality of control keys, a control module having controls for controlling video storage devices and a plurality of control keys, or a control module having a keypad comprising a plurality of control keys.

9. A surveillance system controller as recited in claim 5, wherein said third cavity is located in said housing so that an arc drawn from the periphery of said first, second and third cavities is similar in shape to said convex shape of said first side of said housing.

10. A surveillance system controller as recited in claim 9, wherein said housing has a second side opposite first side and that is higher than said first side so that the top surface of said housing slopes from said second side to said first side.

11. A surveillance system controller as recited in claim 1 wherein said first and second cavities are located at opposite sides of said housing so that said first and second control modules can be rotated to accommodate the ergonomic needs of a user.

12. A surveillance controller as recited in claim 11 wherein said first and second control modules are interchangeable.

* * * * *